Feb. 8, 1927.                                       1,617,045
N. C. DARLING
LAWN MOWER
Filed May 17, 1924     3 Sheets-Sheet 2
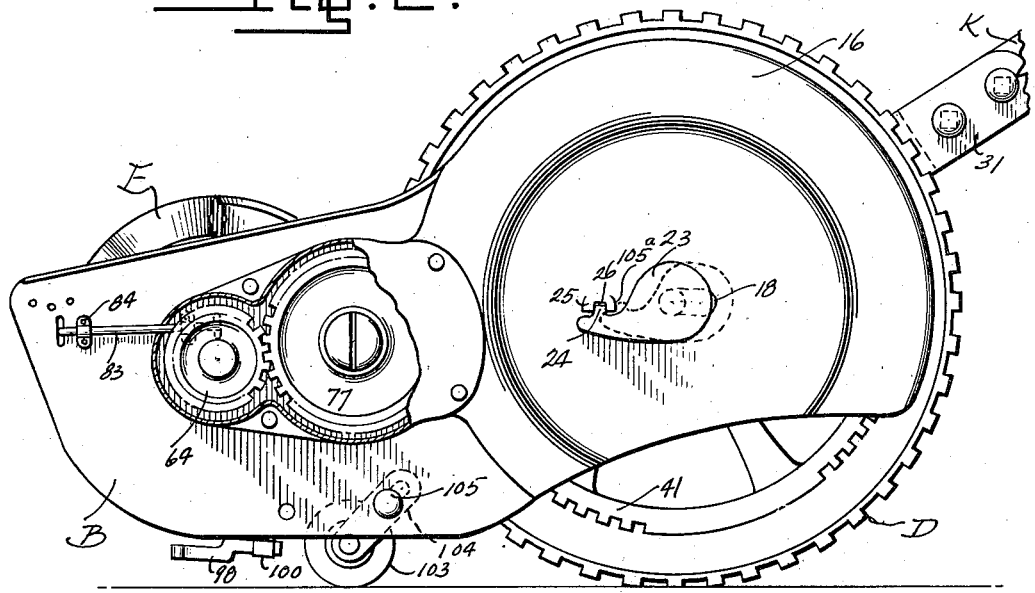
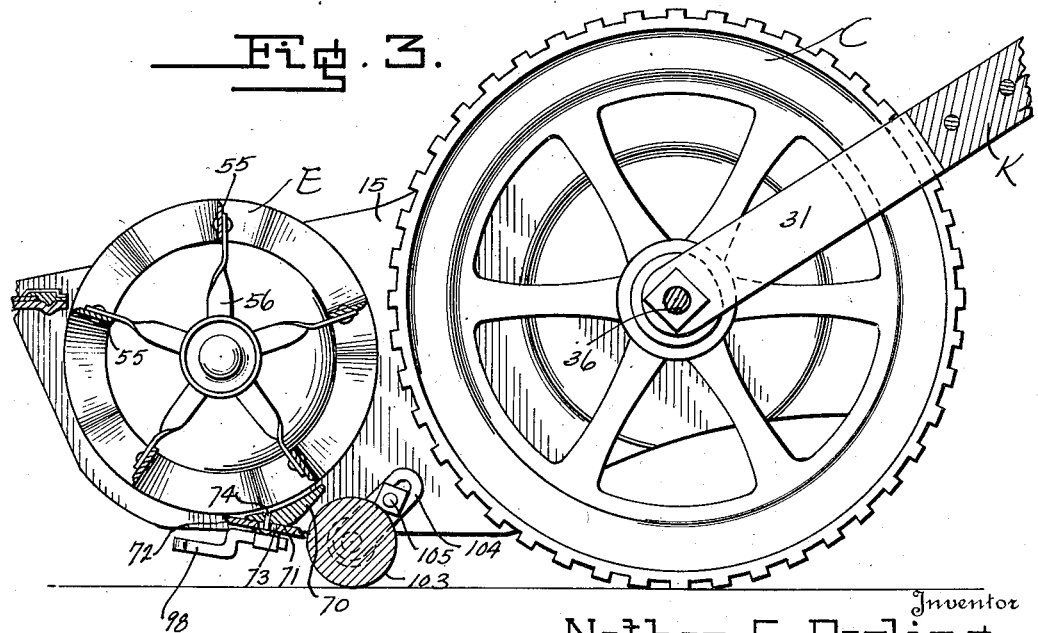
Inventor
Nathan C. Darling Feb. 8, 1927.  1,617,045
N. C. DARLING
LAWN MOWER
Filed May 17, 1924   3 Sheets-Sheet 3
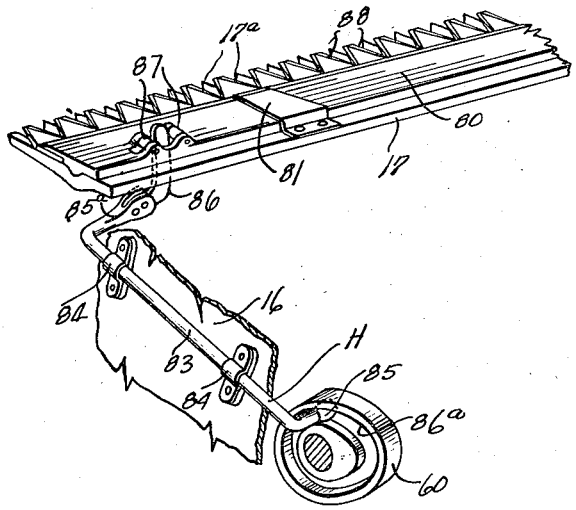
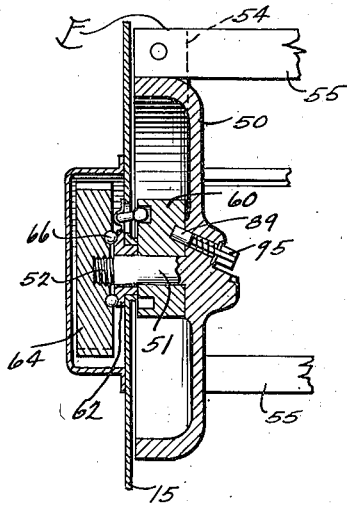
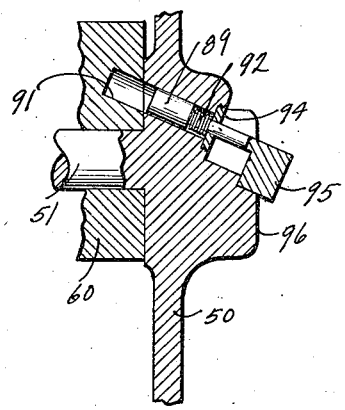
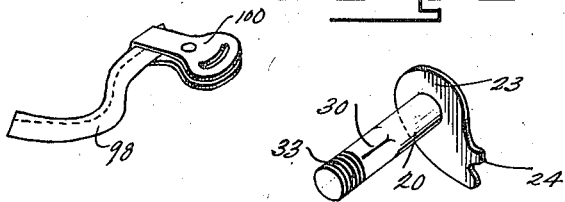
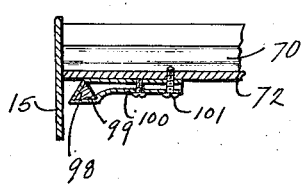
Inventor
Nathan C. Darling
By Lancaster and Alwin
Attorneys Patented Feb. 8, 1927.

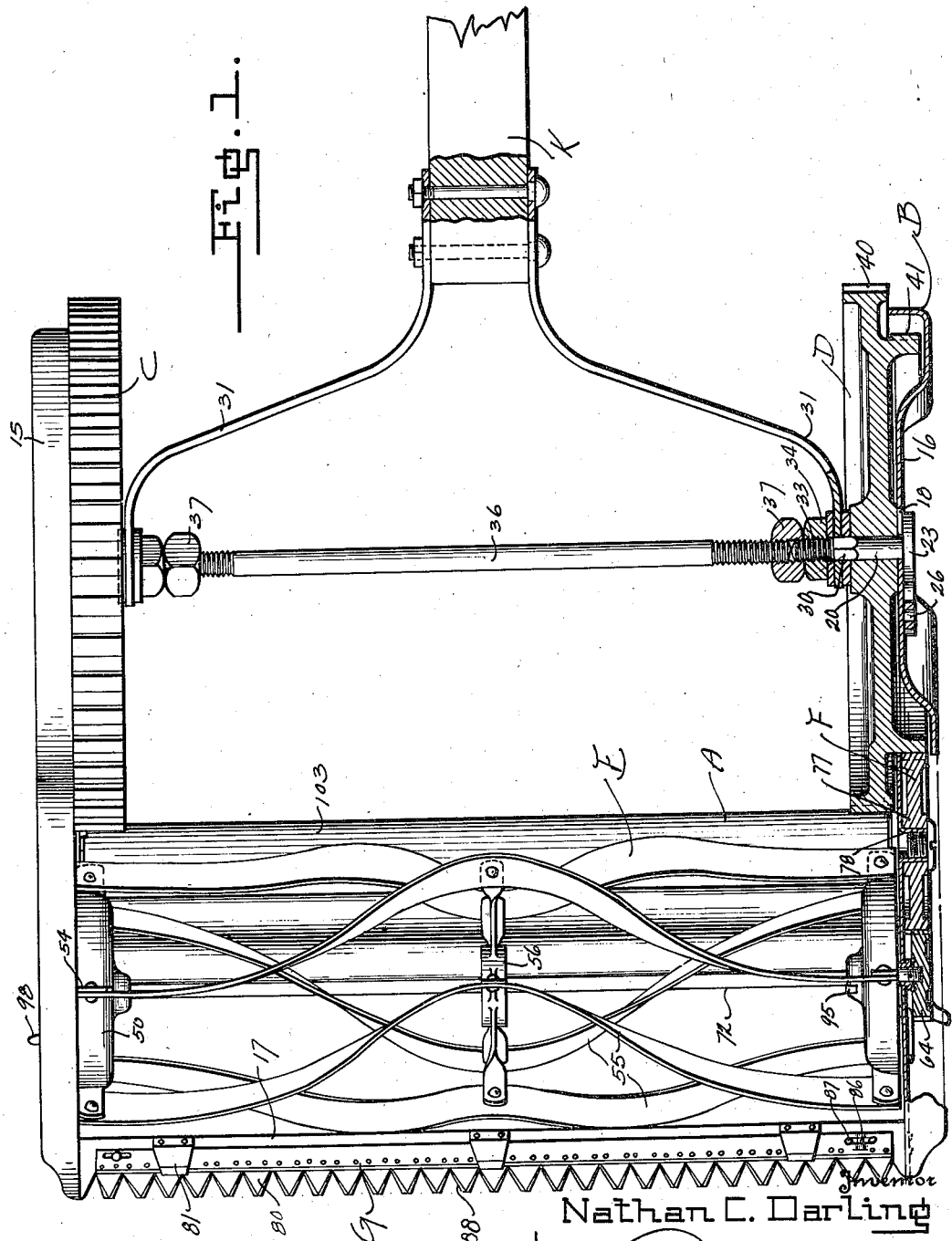

1,617,045

UNITED STATES PATENT OFFICE.

NATHAN C. DARLING, OF ORLEANS, MASSACHUSETTS.

LAWN MOWER.

Application filed May 17, 1924. Serial No. 714,027.

This invention relates to improvements in lawn mowers.

The primary object of this invention is the provision of a machine adapted to effectively cut grass in facile manner with a minimum amount of exertion.

A further and important object of this invention is the provision of a lawn mower which is constructed to cut tall grass as well as short grass.

A further and important object of this invention is the provision of a lawn mower which is adaptable for cutting grass in close quarters where ordinary lawn mowers cannot be propelled.

A further object of this invention is the provision of novel means for cutting a wide swath and for throwing the grass towards the center of the cutting path.

A further and very important object of this invention is the provision of a lawn mower which embodies traction wheels adapted to act as driving members for a cutter mechanism which are so related to the cutter mechanism that when turning a corner the inside traction wheel may be released with respect to the cutter mechanism, thus producing a differential effect.

A further object of this invention is the provision of a lawn mower which embodies means for guiding grass from the sides of the lawn mower or from a prostrate position into the cutter.

Other objects and advantages of this invention will be apparent during the course of the following detailed description.

In the accompanying drawings, forming a part of the specification, and wherein similar reference characters designate corresponding parts throughout the several views, Figure 1 is a fragmentary plan view of the improved lawn mower, showing parts thereof in section.

Figure 2 is a fragmentary side elevation of the improved lawn mower and its details.

Figure 3 is a cross sectional view taken through the improved lawn mower.

Figure 4 is a fragmentary perspective view showing a novel cutter means for the cutting of tall grass, and the means for the operation of the same.

Figure 5 is a fragmentary sectional view showing details of the cutter operating means.

Figure 6 is an enlarged fragmentary sectional view taken thru details of the lawn mower, showing a control device for the cutter means illustrated in Figure 4.

Figure 7 is a fragmentary cross sectional view showing the manner of mounting a guide finger or member upon the mower.

Figures 8 and 9 are perspective views of improved details of this invention.

In the drawings, wherein for the purpose of illustration is shown only the preferred embodiment of this invention the letter A may generally designate the improved lawn mower which may include a supporting frame B; traction drive wheels C and D; rotary cutter means E; means F carried by the supporting frame B for each of the traction drive wheels C and D for the drive of the cutter E; a reciprocatory tall grass cutter G; means H for the operation and control of the cutter G; and a handle K.

The frame B mainly consists of the side supporting plates 15 and 16 which have their forward ends connected by means of a connecting bar 17; this bar 17, in fact being a detail of the reciprocatory cutter G, as will be subsequently described. Each of the plates 15 and 16, to the rear thereof is provided with a longitudinally extending slot 18 through which stub shafts 20 are rotatably and slidably mounted for rotatably supporting the traction drive wheels C and D thereon. These stub shafts 20 laterally thereof and on the outside of the plates 15 and 16 are provided with regulating plates or extensions 23 each preferably having an upwardly extending control lug 24 thereon, for the purpose of cooperating with lug extensions 25 formed laterally on the outer surface of each of the supporting frame plates 15 and 16; these lug extensions 25 each having a downwardly facing recess 26 therein for cooperatively receiving the lug extension 24 of the plate 23, in a manner which will be subsequently described. As above mentioned, the traction wheels C and D are rotatably mounted upon the stub extensions 20, and each of these stub extensions 20 is provided with a square shaped part 30 adapted to receive thereover a connecting portion 31 of the handle structure K; the portions 31 having square openings therein by means of which the stub shafts 20 may be rigidly connected with the handle K, so that upon rocking the handle K the stub shafts 20 will be similarly rocked with respect to the frame plates 15 and 16. Outwardly of the squared portion 30, and at the free end of each of the stub shafts 20 a screw threaded shank 33 is provided, adapted to receive a nut 34 for clamping of the handle bales 31 in the relation described. If desired, a cross rod 36 may be provided, which is screw threaded at its ends, and each screw threaded end receives a lock nut 37, which is adapted to engage over the free screw threaded end 33 of each stub shaft 20 for the purpose of locking the cross rod 36 in a bracing relation between the adjacent stub shafts 20, substantially as is illustrated in Figure 1 of the drawings. While it is not necessary to provide this cross rod 36, yet it may be effectively used for bracing the rear portion of the lawn mower, and for supporting a grass catcher. Notwithstanding the provision of the cross rod 36 the traction wheels C and D are to be regarded as mounted for independent sliding in their slots 18, to provide the differential driving effect with respect to the rotary cutter E, as will be subsequently described.

Each of the traction wheels C and D is preferably provided with a serrated tread 40, and outwardly of the wheel a bull gear 41 is cast integral therewith, and of less diameter than the tread of the wheel; these gears 41 fitting into suitable recesses provided in the frame plates 15 and 16 therefor, and as is illustrated in Figure 1 of the drawings.

Referring to the improved rotary cutter E, the same preferably includes a hollow disc shaped wheel member 50 for each of the plates 15 and 16, which centrally thereof is provided with a stub shaft 51 integral therewith, and extending through the hollow of the wheel and at its external end being screw threaded, as at 52. The wheels 50 are rotatably supported by the side plates 15 and 16, at the inner surfaces of said side plates, and each of said wheels 50 is of sufficient weight to act as a flywheel in giving momentum to the rotary cutter for the purpose of effecting a shearing action. A plurality of radially extending lugs 54 are provided upon the peripheries of each of the wheels 50, for the purpose of securing the cutter blades 55 transversely across the lawn mower to the wheels 50. These blades 55 are each of U-shaped formation intermediate their ends, and having their ends extending in substantially aligning relation for attachment to the lugs 54. At their intermediate portions the blades 55 are supported by a spider 56 which is disposed within the area provided by the blades of the rotary cutter, and as illustrated in Figures 1 and 3 of the drawings. The purpose of providing the blades 55 of the shape shown and above mentioned is in order to throw the cut grass toward the center of the path of travel of the mower, and not outwardly of the swath, as is the case with the conventional blade construction of lawn mowers.

Each of the wheels 50 of the rotary cutter 70 inwardly thereof is provided with a cam 60 which is freely mounted on the stub shaft 51. The stub shaft 51 extends through a ring shaped bearing 62 fixed within a suitable squared opening in the side of each of the plates 15 and 16, so that the screw threaded end 52 of the shaft 51 extends exteriorly of the bearing 62, for receiving a relatively small gear 64, which may be fixed in any approved manner to the screw threaded end 52. Roller bearings or anti-friction means 66 may be placed between the gear 64 and the bearing 62 for the more effective operation of the rotary cutter.

A substantially triangular shaped bar 70 is supported by the plates 15 and 16, below and slightly to the rear of the rotary cutter E. The lower surface 71 of the bar 70 is provided to receive the knife or stationary blade 72 in abutting relation therewith; slots 73 being provided in the knife blade 72 for adjustable connection of the blade 72 to the bar 70 by means of screws 74 or the like. Opposite longitudinal edges of the knife 72 are beveled, and the knife blade 72 may be fed toward or away from the blades of the rotary cutter E, to secure the desired shearing adjustment. It is to be particularly noted that the blade 72 may be reversed, so that when one cutting edge thereof becomes worn the other may be used, Referring to the means F carried by each of the plates 15 and 16 for driving connection between the rotary cutter E and the traction wheels C and D, this means includes the gear 64 above mentioned as being fixed with the rotary cutter E at each end thereof. An intermediate gear 77 is rotatably carried by a stub extension 78 on each of the plates 15 and 16; these intermediate gears 77 being in meshing relation with the relatively smaller gears 64 above mentioned, and the teeth of the gears 77 being located so that the teeth of the drive wheel gears 41 may mesh therewith.

Referring to the reciprocatory cutter G, the same includes the transverse bar 17 above mentioned, which is supported by the plates 15 and 16 forwardly of and above the axis of rotation of the rotary cutter E. The forward edge of this bar 17 is provided with tapered teeth 17ª, and upwardly on the bar 17 a reciprocatory cutter 80 is supported, being guided in its movement by flanges 81 supported by the bar 17. The means H for operating the cutter 80 consists of a substantially U-shaped operating rod 83 supported for oscillation in bearings 84 at a side of the plate 16; one end 85 of this rod 83 extending into the cam groove 86ª formed in the cam 60 above mentioned. While the operating rod 83 may be provided on each of the plates 15 and 16, one of them is all that is necessary. The opposite end 85ª of the operating rod 83 is bent substantially parallel with the end portion 85 and at right angles to the rod 83, and is bifurcated for receiving a rigid guide finger 86 thereon, which extends upwardly for slidable connection between the rollers 87 which are supported by the knife bar 80 across a suitable slot provided in said knife bar. It can be readily understood that upon rotation of the rotary cutter E, the cam 60 rotating therewith will cause the operating rod 83 to oscillate for the purpose of moving the finger 86 back and forth, and the same riding between the rollers 87 will cause reciprocation of the bar 80, so that the teeth 88 thereof will slide across the teeth 17ª for the purpose of cutting relatively tall grass which cannot be conveniently cut by the short grass rotary cutter member E. If desired, the reciprocatory cutter construction G may be cut out of operation, and to this end the cam member 60 is freely mounted upon the stub shaft 51, and the plunger 89 is slidably supported by the wheel 50 of the rotary cutter so that it may be moved into or out of engagement with a socket 91 provided in a side of the cam 60, and as illustrated in Figures 5 and 6 of the drawings. A spring 92 normally urges the plunger 89 toward the socket 91, and this spring 92 is held in position in the wheel 50 by means of a threaded cap 94. A head 95 on the plunger 89 may engage against the hub 96 of the wheel 50 for the purpose of holding the plunger out of engagement with the cam 60, as is illustrated in Figure 6.

Novel means is provided for drawing stalks of grass from the sides of the mower into cutting relation with the blades of the cutter, this means consisting of novel guide fingers 98, which are arcuated at their outer ends and at their opposite ends being substantially triangular in cross section adapted for support in triangular sockets 99 of suitable clamps 100, which may be supported by means 101 upon the bottom of the stationary cutter blade 72. It is to be noted that due to the triangular formation of the socket 99, the fingers 98 may be supported so that the arcuate end portions extend laterally of the side plates of the lawn mower, and guide grass inwardly from the sides of the mower, or these fingers 98 may be placed to extend downwardly toward the ground for the purpose of lifting fallen grass into cutting relation with the blades of the rotary cutter. The apertures in the clamps 100 for these fingers are preferably arcuate slots, substantially as is illustrated in Figure 8, and by means of which the screws 101 may support the same in a desired position.

A gauge roller 103 is rotatably supported by bracket arms 104 between the rotary cutter and the traction drive wheels C and D; these brackets 104 being slotted at their upper ends for connection by bolts 105 to the side plates 15 and 16 of the supporting frame B.

In operation, if it is desired to push the mower without operating the rotary cutter E, the operator first pushes up and then pulls the handle K to the rear which causes the stub axles 20 to slide rearwardly in the slots 18 of the plates 15 and 16, and also to disengage gears 41 and 77. Then by pushing down upon the handle the lugs 24 of the plates 23 will ride to engage the rear surface 105ª of the plate lugs 25, and consequently hold the gears 41 of the wheels C and D out of meshing relation with the intermediate gears 77. The lawn mower may then be propelled without rotating the cutter E. In some instances where it is desirable to positively hold the gears 41 in a meshing relation with the intermediate gears 77, the handle K may be so manipulated as to move the lugs 24 of the plate 23 into the recesses 26, and the lawn mower may then be propelled for positive rotation of the cutter E. In most instances, the operator may hold the handle so that the lugs 24 need not necessarily be in direct engagement with the plate lugs 25, and merely by forward pushing upon the handle K the gears 41 of the wheels C and D will both be in an intermeshing relation with the means F which connects the rotary cutter E for operation. When the lawn mower is swung around a corner the transverse swinging motion given the handle will cause the rod 36 to be drawn rearwardly at one end and the gear 41 of the outside wheel will be retained in meshing relation with its intermediate gear 77, and the gear 41 of the inside wheel will move rearwardly out of intermeshing relation with its gear 77; this action being permitted incident to the sliding operation of the stub shafts 20 in the slots 18 of the plates 15 and 16, and very slight end play of the stub shafts with respect to the side plates. Therefore the inside wheel will be released and the wheels may act in the same manner as the rear drive wheels of an automobile when turning a corner.

From the foregoing description of this invention it is apparent that a lawn mower has been provided which is universally adapted for the cutting of grass of different characters under different circumstances, facilitating the cutting action and permitting the cutting to be done with a minimum amount of exertion and in a highly efficient manner.

Various changes in the shape, size, and arrangement of parts may be made to the form of invention herein shown and described, without departing from the spirit of this invention or the scope of the claims.

I claim:

1. In a lawn mower the combination of a frame, side traction wheels, cutter means supported by the frame, guide fingers, and means supporting the guide fingers at opposite sides of the frame in cooperating relation with the cutter means and with said fingers formed at an inclination and extending outwardly beyond the ends of said cutter means and beyond the planes of said traction wheels to draw grass from the outer sides of the lawn mower into cutting relation with the cutter means as the lawn mower is advanced.

2. In a lawn mower the combination of a frame including side plates, traction wheels, cutter means including a movable element operable by rotation of said traction wheels and a stationary element beneath the movable element, and arcuated guide fingers mounted beneath the stationary cutter element and extending forwardly with respect to the stationary cutter element and outwardly of the side plate whereby to draw grass from the outer sides of the lawn mower into cutting relation with the cutter means.

3. In a lawn mower the combination of a frame, cutting means carried by the frame, a member rigid with the frame, clamps carried by said member adjacent each side of said frame, said clamps providing triangular shaped sockets therein, and grass guide fingers arcuated at their outer ends and providing a portion of triangular cross section at their inner ends for reception in the triangular sockets of said clamps whereby the fingers may be positioned to either extend laterally of the lawn mower for the purpose of drawing grass into the cutting means or extend downwardly towards the ground for the purpose of lifting fallen grass into the cutter.

4. In a lawn mower the combination of a supporting frame, a cutter, independently rotatable traction wheels supporting the frame, and gearing means for transmitting movement from the traction wheels to the cutter, the traction wheels being movable towards and away from the gearing means, and a handle having connection with the traction wheels whereby the traction wheels may be held in engagement with the gearing means and selectively moved out of engagement therewith.

5. In a lawn mower the combination of supporting plates, a cutter carried by the plates, gear means carried by each plate in driving relation with the cutter, traction wheels independently rotatable and slidably connected with said supporting plates adapted to slide along said plates to engage or disengage said gear means, means for releasably holding the traction wheels against sliding out of engagement with the gearing means, and handle means connected with the traction wheels for moving the traction wheels into and out of engagement with the gearing means.

6. In a lawn mower the combination of a supporting frame consisting of a pair of side plates having slots therein, a cutter carried by said side plates, axle means slidable along and oscillatable in the slots of said side plates, traction wheels independently rotatable upon said axle means, gears rigidly carried by each of said traction wheels, and gearing means connecting each of the gears of said wheel with said cutter, the lawn mower during a turning action adapted to have the outside wheel gear mesh with its cooperating gear means and the inside gear wheel move out of meshing relation with its gear means incident to sliding of the axle means along the slot in the plate adjacent the inside wheel.

7. In a lawn mower the combination of a supporting frame including a pair of side plates having slots horizontally disposed therein, stub axles carried in said slots for sliding therealong, traction wheels rotatable on said stub axles, handle means rigid with said stub axles, cutter means carried by said supporting frame, and gear means connected with said cutter means at each side plate, said traction wheels adapted to engage with the last mentioned means in a driving relation for operation of said cutter means when the stub axles thereof are disposed most forwardly in their slots toward said cutter means.

8. In a lawn mower the combination of a supporting frame, a rotary cutter carried by said supporting frame on a fixed axis, ground engaging running gear supported by said frame on an axis which may be moved toward or away from the rotary cutter axis, and means in driving engagement with the rotary cutter with which the running gear may engage in a driving relation only when running gear is most forwardly disposed with respect to the said rotary cutter.

9. In a lawn mower the combination of a pair of side supporting plates having slots therein, stub axles oscillatable and slidable in said slots, traction wheels rotatable upon said stub axles, gears rigid with said wheels, a rotary cutter, gears supported by the rotary cutter at said side plates, intermediate gears in meshing relation with said last mentioned gears, and handle means for said stub axles adapted to move the stub axles and traction wheels along said side plates for the purpose of meshing the gears of said wheels with the intermediate gears.

10. In a lawn mower the combination of a supporting frame consisting of running gear, side plates having a longitudinally slidable connection with the running gear, handle means carried by the running gear, a rotary cutter rotatable on a fixed axis in said side plates, a cam rotatable with said rotary cutter, gear means carried by said rotary cutter with which the running gear may mesh when the handle is pushed forwardly to move the running gear into driving relation with the rotary cutter, a knife bar supported forwardly of the rotary cutter and upwardly of the same, a reciprocatory knife mounted on said knife bar, and an operating rod connecting said reciprocatory knife with said cam whereby upon propelling of the lawn mower and upon operation of the rotary cutter said cam will be rotated for actuating the operating bar to reciprocate said knife.

11. In a lawn mower the combination of a supporting frame consisting of running gear, side plates having a longitudinal slidable connection with the running gear, handle means carried by the running gear, a rotary cutter rotatable on a fixed axis in said side plates, a cam rotatable with said rotary cutter, gear means carried by said rotary cutter with which the running gear may mesh when the handle is pushed forwardly to move the running gear into driving relation with the rotary cutter, a knife bar supported forwardly of the rotary cutter and upwardly of the same, a reciprocatory knife mounted on said knife bar, an operating rod connecting said reciprocatory knife with said cam whereby upon propelling of the lawn mower and upon operation of the rotary cutter said cam will be rotated for actuating the operating bar to reciprocate said knife, and means for holding the cam out of rotating relation with respect to said rotary cutter for the purpose of maintaining the reciprocatory knife inoperative during operation of said rotary cutter.

NATHAN C. DARLING.